(12) United States Patent
Hochhalter et al.

(10) Patent No.: US 8,047,417 B2
(45) Date of Patent: Nov. 1, 2011

(54) ROTATABLE TOOL AND APPARATUS THEREFOR

(75) Inventors: Keith Hochhalter, Inverness, IL (US); Mike T. Seiler, Kenosha, WI (US); Drew O. Taylor, Otsego, MN (US)

(73) Assignee: Tol-O-Matic, Inc., Hamel, MN (US)

( * ) Notice: Subject to any disclaimer, the term of this patent is extended or adjusted under 35 U.S.C. 154(b) by 157 days.

(21) Appl. No.: 11/634,362

(22) Filed: Dec. 5, 2006

(65) Prior Publication Data

US 2007/0164086 A1    Jul. 19, 2007

Related U.S. Application Data

(60) Provisional application No. 60/742,585, filed on Dec. 6, 2005.

(51) Int. Cl.
*B23K 20/12* (2006.01)
(52) U.S. Cl. ........................ 228/2.1; 228/112.1
(58) Field of Classification Search ............... 228/112.1, 228/2.1
See application file for complete search history.

(56) References Cited

U.S. PATENT DOCUMENTS

| | | | |
|---|---|---|---|
| 6,756,707 B2 * | 6/2004 | Hochhalter et al. | 310/20 |
| 7,322,509 B2 * | 1/2008 | Sato | 228/2.1 |
| 2003/0029903 A1 | 2/2003 | Kashiki et al. | |
| 2003/0209586 A1 | 11/2003 | Thompson | |
| 2004/0079787 A1 | 4/2004 | Okamoto et al. | |
| 2005/0029331 A1 | 2/2005 | Kano et al. | |
| 2006/0081679 A1 * | 4/2006 | Sato et al. | 228/2.1 |
| 2006/0169740 A1 | 8/2006 | Fukuhara et al. | |

FOREIGN PATENT DOCUMENTS

| | | |
|---|---|---|
| EP | 1 557 233 A3 | 2/2005 |
| EP | 1 557 233 A2 | 7/2005 |
| JP | 20063150677 A1 | 11/2006 |

OTHER PUBLICATIONS http://www.twi.co.uk/professiona/unprotected/band_1/fswipr.html; "Friction Stir Welding—Intellectual Property Rights", Copyright 2005 TWI Ltd., 1 pg.
http://en.wikipedia.org/wiki/Friction_stir_welding; "Friction Stir Welding", Nov. 7, 2006, Wikimedia Foundation, Inc., 7 pgs.
http://www.twi.co.uk/professional/unprotected/band_1/fswpatents.html; "Known friction stir welding patents and patent applications", Copyright 2006 TWI Ltd., 1 pg.

* cited by examiner

*Primary Examiner* — Emily Le
*Assistant Examiner* — Megha Mehta
(74) *Attorney, Agent, or Firm* — Dorsey & Whitney LLP

(57) ABSTRACT

A friction stir weld apparatus having a linear drive actuator and a separate friction stir weld device. The linear actuator and the friction stir weld device are driven by concentric motors. In the preferred embodiment, the thrust member of the actuator is connected to the friction stir weld device within or adjacent to the friction stir weld device motor to advance and retract the friction stir weld device along a linear axis concentric with the actuator and friction stir weld device motors.

17 Claims, 4 Drawing Sheets

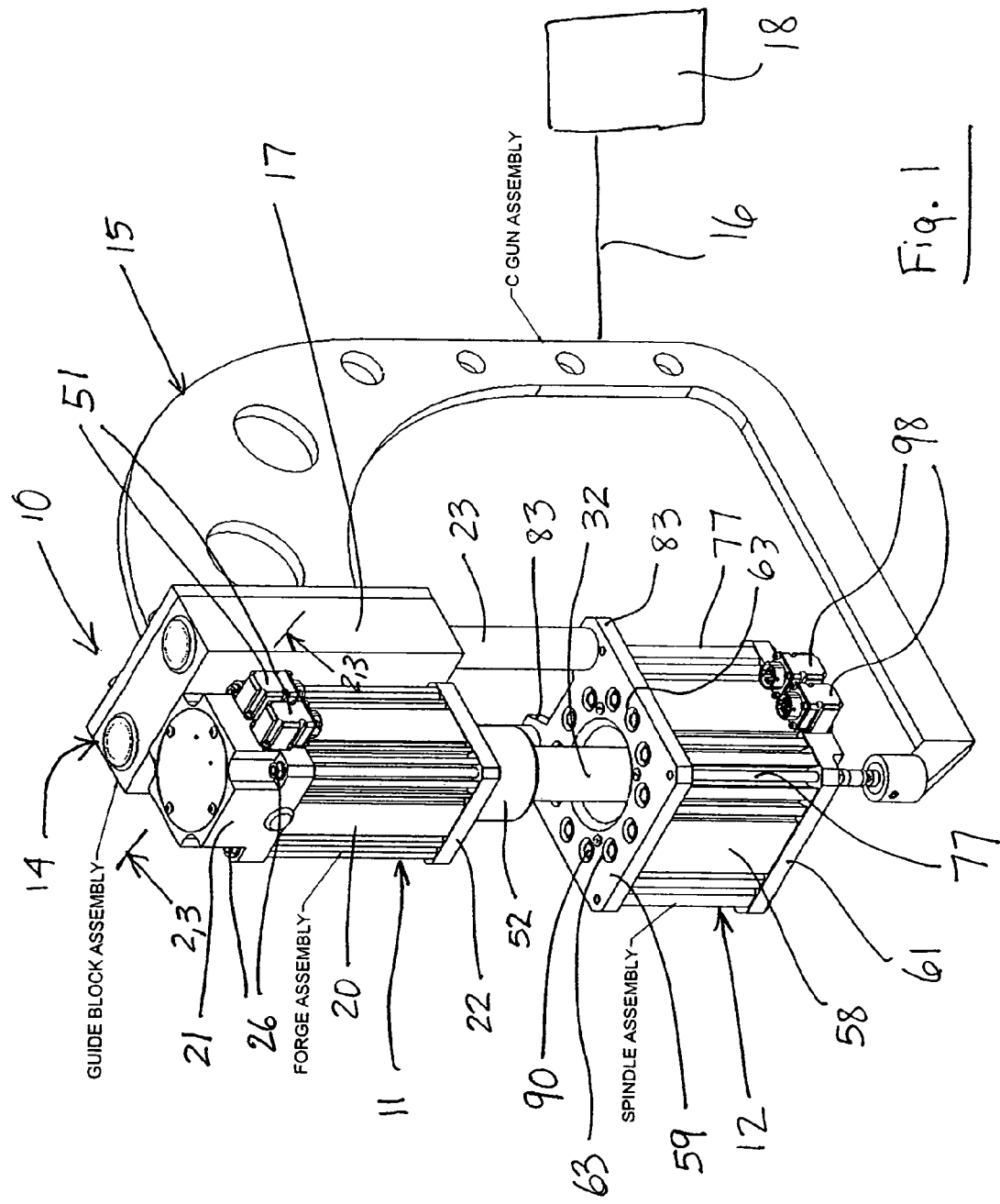

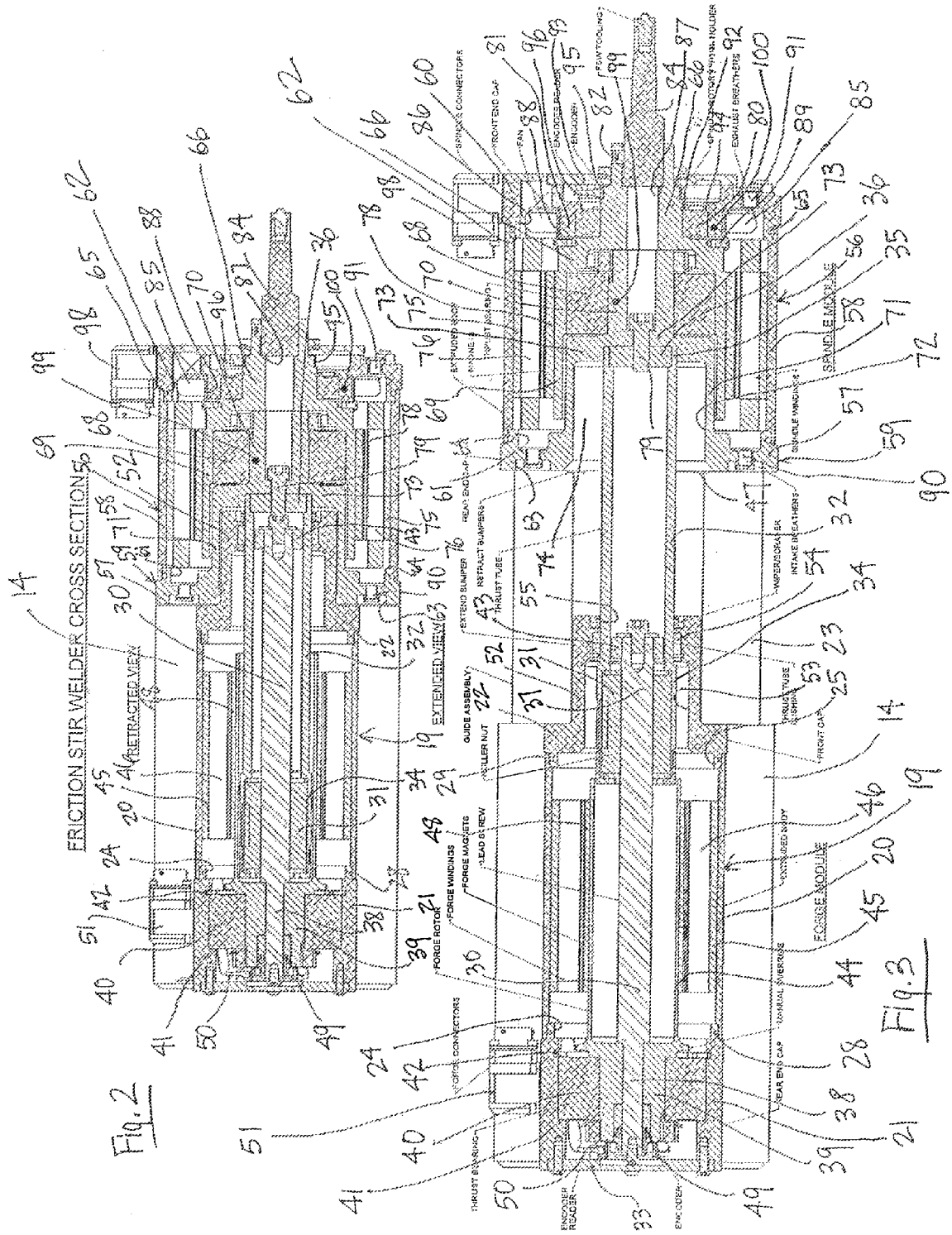

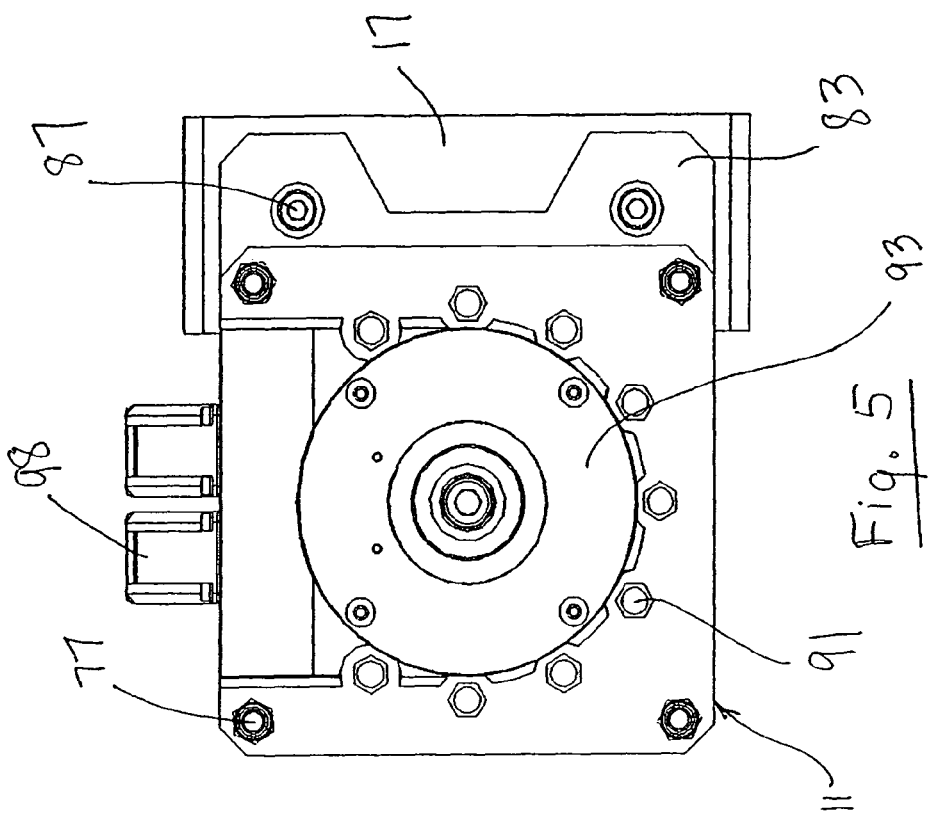
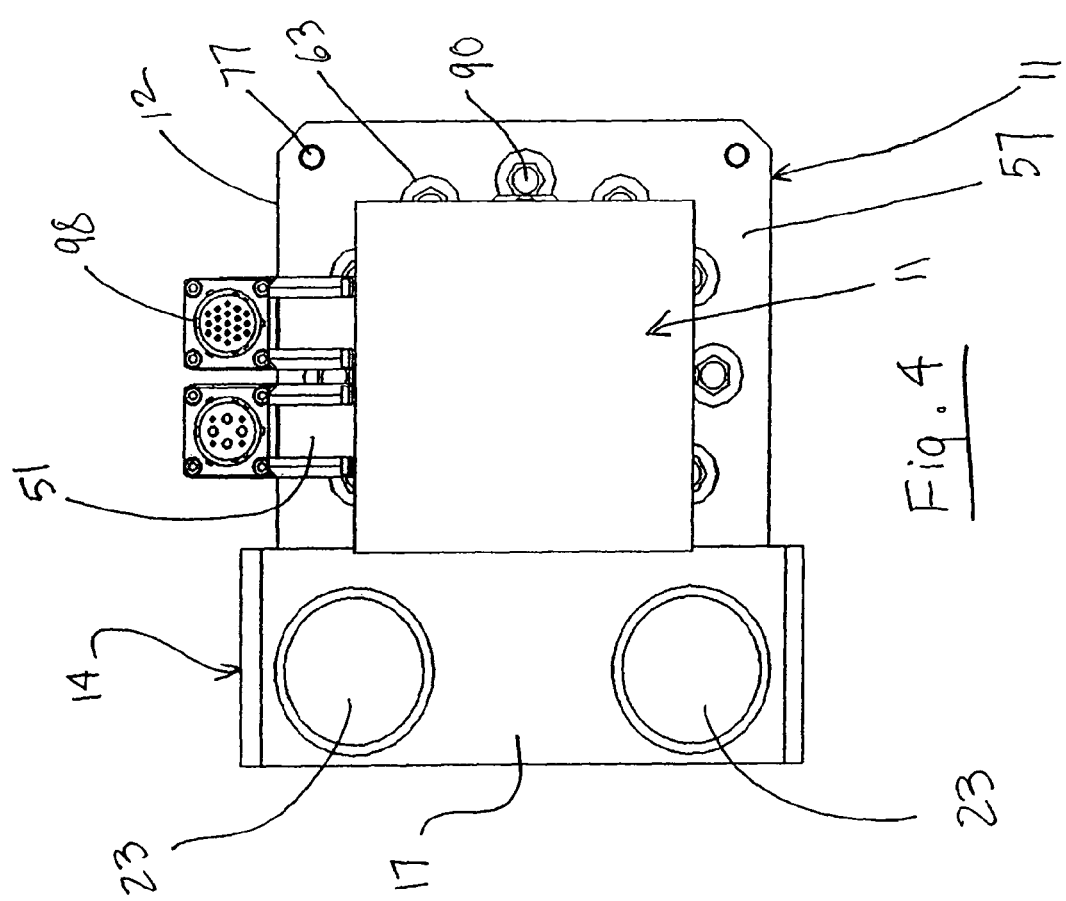

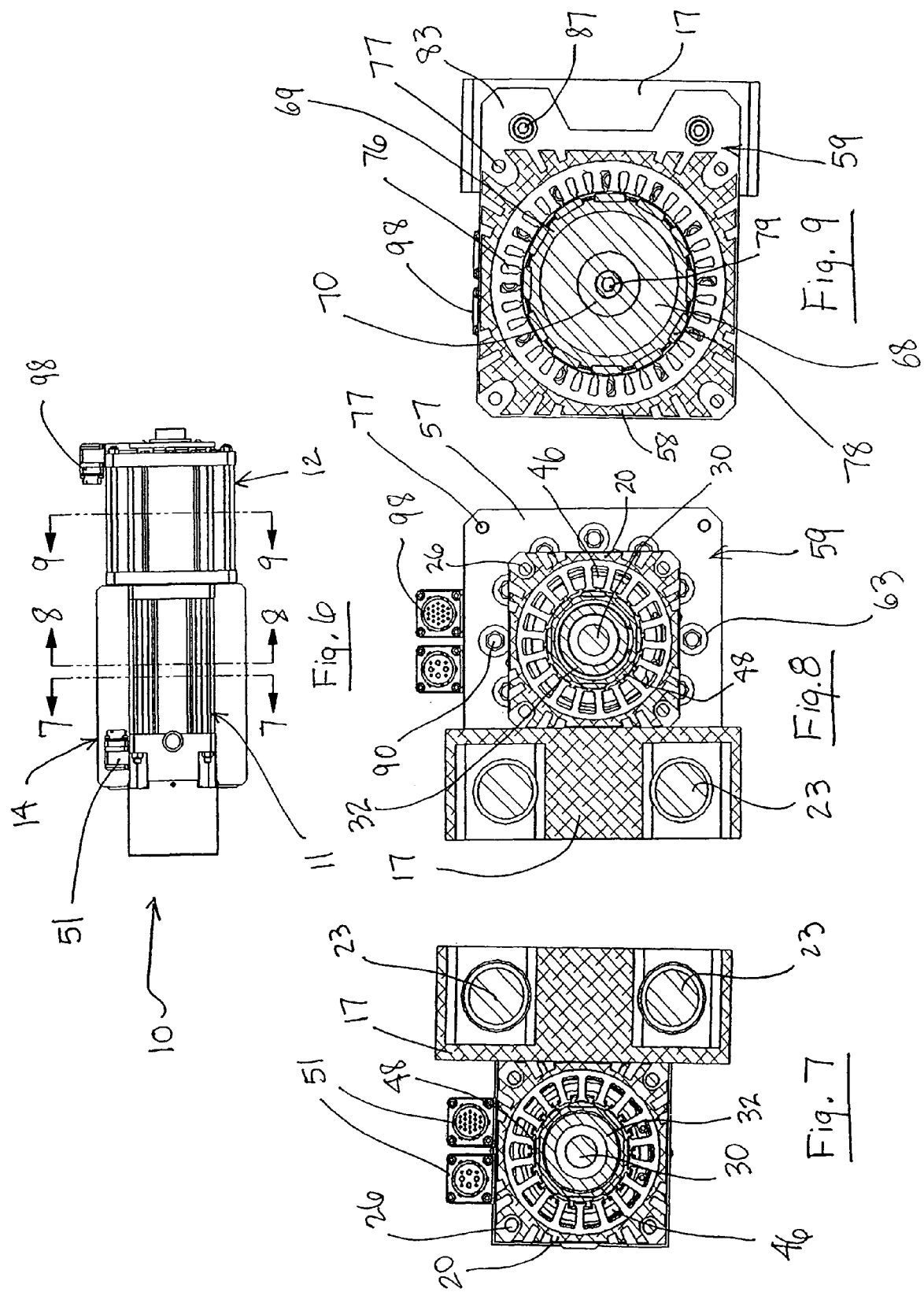

ROTATABLE TOOL AND APPARATUS THEREFOR

BACKGROUND OF THE INVENTION

1. Field of the Invention

The present invention relates to a rotatable tool and apparatus therefor, and more specifically to a rotatable, linearly moveable tool and apparatus such as an apparatus and device for friction stir spot and/or stitch welding.

2. Description of the Prior Art

Various tools or devices with rotatable tool heads are also linearly moveable, or designed for linear movement, between operative and non-operative positions or between various linear stages of operative positions. Examples include tools and devices for friction stir welding, machining/milling, boring/drilling, routing, screw fastening and lift and rotate operations, among others. Desired characteristics of all such tools and devices is that they exhibit excellent stability and balance and are as linearly compact as possible. Although the present invention has potential applicability to all of the above, it has particular applicability to friction stir welding and more specifically to an apparatus and device for friction stir spot and/or stitch welding. Accordingly, the summary of the invention and the preferred embodiment will be described with respect to an apparatus and device for friction stir spot and/or stitch welding.

Friction stir welding (FSW) is a material joining technique invented by the Welding Institute of England in 1991. The process involves applying a rotating tool or tool head of various configurations to the abutting faces of two or more workpieces, thereby generating frictional heat. The frictional heat in turn creates a softened plasticized region around the immersed rotating tool which is extruded from the leading side to the trailing side of the tool as the tool traverses along the joint. Friction stir welding is attractive for its ability to join various metals including various aluminum alloys, lead, magnesium, steel, titanium, zinc, copper, various metal matrix composites and various other metals often considered as being difficult to weld.

Friction stir welding has been used extensively to perform seam welding either to join two pieces of material together along a lap seam or joint or along a butt seam or joint. More recently, friction stir welding has been applied to spot welds by pressing the rotating head of the FSW tool against the outer surface of two or more layers of material. During the friction stir spot welding process, the rotating head creates friction to plasticize the various layers of material, after which the tool is withdrawn, leaving a spot weld joining the two or more layers of material.

Conventional spot welding involves positioning a pair of electrodes on opposite sides of two or more layers of material and applying sufficient welding energy and pressure to join the layers together. Conventional spot welding is widely used in various industries and applications including the automotive industry. While the use of friction stir spot welding has significant potential applicability for use in the automotive and these various other industries, it also faces several obstacles. These include, among others, the large size and payload of existing FSW equipment and the cost of such equipment as compared to equipment for other conventional joining or spot welding techniques.

Accordingly, there is a need in the art for a compact, low cost friction stir weld device and apparatus which can be used for spot and/or stitch welding applications.

SUMMARY OF THE INVENTION

The present invention relates generally to linearly moveable apparatus and tools or devices with rotating or selectively rotatable tool heads such as tools or devices for friction stir welding, machining/milling, boring/drilling, routing, screw fastening and lift and rotate operations. More specifically, the preferred embodiment of the present invention relates to a compact, low cost servo driven friction stir weld (FSW) apparatus and device that has particular applicability for spot and/or stitch welding. As used herein, stitch welding is essentially spot welding with a short travel distance, typically an inch or less.

In general, the FSW apparatus or assembly of the present invention includes a forge or motion transmission actuator comprising a linear actuator module, an inline FSW spindle or device and a guide assembly for guiding linear movement of the FSW spindle or device relative to the actuator. In the preferred embodiment, the actuator, the FSW spindle or device and the guide assembly are mounted to a "C" gun assembly similar in concept to "C" gun assemblies used in conventional spot welding. The "C" gun assembly may in turn be mounted via various articulation joints and links to a conventional industrial robot. Alternatively, the FSW apparatus, or the FSW apparatus together with the "C" gun may be used in a pedestal application where it is mounted fixed to a work table or framework.

More specifically, the actuator, the FSW spindle or device and the guide assembly are separate, independent operating modules which can be easily replaced and serviced independent of the other. The actuator module includes a self-contained linear actuator comprising a motor, a lead screw, a nut and a thrust tube or member. Preferably, the motor is an inline motor in that its rotational center is concentric with the lead screw of the actuator. More preferably, the motor is what is sometimes referred to as a hollow core motor in which the lead screw passes through the radial center of the motor.

The FSW spindle or device module includes a tool head appropriate for spot and/or stitch welding and a motor for rotating the FSW tool head. Preferably, the motor for the FSW module is an inline motor with its center of rotation concentric with the rotational center of the tool head. More preferably, the motor is a hollow core, inline motor. The FSW module further includes a housing which minimizes the overall size and length of the friction stir welding apparatus and thus facilitates an extremely compact FSW apparatus and system. Specifically, the FSW device housing includes a rear end cap which defines an internal nesting cavity partially positioned internally within the FSW motor. This nesting cavity enables a portion of the forward end or end cap of the actuator module to nest within this cavity when the FSW module is in its retracted position, thereby resulting in an extremely compact apparatus.

The rear end cap of the FSW spindle or device housing also includes a forwardly extending portion with a radially outwardly facing longitudinal surface for supporting the FSW rotor via a thrust bearing. In the preferred embodiment, this thrust bearing is positioned radially between this outer longitudinal surface of the rear end cap or housing portion and an inner longitudinal surface of the rotor and is positioned longitudinally between the ends of the FSW motor.

The FSW module further includes a fan which is attached to the FSW rotor and is thus driven by the FSW motor. The fan draws cooling air in from the rearward end of the FSW device and exhausts it at the forward end to cool the motor and the FSW tooling during operation.

The FSW module is also provided with thermal or temperature sensors for sensing and monitoring FSW component temperatures. This temperature information allows the linear axis motion control system to compensate for thermal expansion of such components to provide for more accurate depth control.

In the preferred embodiment, the actuator module and the FSW module are mounted relative to one another so that the rotational axes of their respective motors are inline or concentric with one another and so that the thrust member is connected with the FSW module immediately adjacent to or within the FSW spindle motor. More preferably, the forward end of the actuator module housing and the rearward end of the FSW module housing are configured so that they are capable of nesting with one another when the FSW module is retracted. This facilitates the significantly compact structure of the FSW apparatus.

The guide assembly includes a guide block which is preferably fixed to an arm of the "C" gun assembly and includes guide means connected with the FSW module for guiding the FSW module in linear movement relative to the actuator module and the guide block between a retracted position and various extended positions. In the preferred embodiment, the guide means includes a pair of guide rods, each having a free end connected with a portion of the FSW module. The guide rods are slidably received within guide channels in the guide block. The actuator module is fixed relative to the guide assembly.

Accordingly, an object of the present invention is to provide an improved, linearly moveable tool or device with a rotatable tool head.

Another object of the present invention to provide a friction stir welding apparatus and method usable for friction stir spot and/or stitch weld applications.

Another object of the present invention is to provide a friction stir spot and/or stitch weld apparatus and method comprising a self-contained, independently operable linear actuator and a self-contained, independently operable and inline friction stir weld device.

A further object of the present invention is to provide an inline linear actuator and a friction stir weld spindle or other device which are capable of nesting within one another when the device is in its retracted position.

A still further object of the present invention is to provide a friction stir weld or other apparatus in which the actuator and FSW or other device motors are in line with one another and in line with the FSW or other device tool head.

These and other objects of the present invention will become apparent with reference to the drawings, the description of the preferred embodiment and the appended claims.

DESCRIPTION OF THE DRAWINGS

FIG. 1 is an isometric view of a friction stir spot and/or stitch weld apparatus in accordance with the present invention.

FIG. 2 is a view, partially in section, as viewed along the section line 2,3-2,3 of FIG. 1, but with the spindle module in its retracted position.

FIG. 3 is a view, partially in section, as viewed along the section line 2,3-2,3 of FIG. 1 with the spindle module in its extended position as shown in FIG. 1.

FIG. 4 is an elevational end view of the actuator module end of the apparatus of the present invention.

FIG. 5 is an elevational end view of the FSW module end of the apparatus of the present invention.

FIG. 6 is an elevational side view of the FSW apparatus in accordance with the present invention.

FIG. 7 is a view, partially in section, as viewed along the section line 7-7 of FIG. 6.

FIG. 8 is a view, partially in section, as viewed along the section line 8-8 of FIG. 6.

FIG. 9 is a view, partially in section, as viewed along the section line 9-9 of FIG. 6.

DESCRIPTION OF THE PREFERRED EMBODIMENT

With reference first to FIG. 1, the friction stir weld apparatus or assembly 10 in accordance with the present invention includes a forge or actuator module 11, a friction stir weld spindle or device module 12, a guide or guide block module 14 and a "C" gun assembly 15. As shown schematically, the "C" gun assembly 15 is connected via conventional articulation joints and links 16 to a conventional industrial robot 18. Alternatively, the apparatus may be used in a pedestal application where it is mounted fixed to a table or framework. In the preferred embodiment as shown, the guide block assembly 14 is rigidly connected to the "C" gun assembly 15 and the actuator assembly 11 is rigidly connected to the guide block assembly 14. The FSW spindle module 12 is connected with a linear thrust tube portion of the actuator module 11. The FSW module 12 is also connected to guide shafts or rods 23 of the block assembly 14 and is thus guided for linear movement relative to the module 11 via the guide block module 14 between a retracted position as shown in FIG. 2 and various extended positions such that shown in FIG. 3. The guide shafts 23 extend into and out of the guide block housing 17 in response to movement of the FSW device 12 via the actuator 11.

The guide shafts 23 are guided and supported within the guide block 17 to accommodate reciprocal linear movement of the FSW module 12 and to provide support and stability to the module 12 during such movement. The guides for the shafts 23 may be a single bronze bushing for each of the shafts or a pair of preloaded ball bearings or other bearing means.

Reference is next made to FIGS. 2 and 3 comprising sectional views of the actuator and FSW assemblies with the FSW assembly in its retracted position as shown in FIG. 2 and with the FSW assembly in one of its extended positions as shown in FIG. 3. Accordingly, with reference to FIGS. 2 and 3, FIGS. 4-9 and continuing reference to FIG. 1, the actuator module 11 (FIG. 1) comprises a linear drive actuator module shown by the reference character 19 (FIGS. 2 and 3) in the form of a servo driven linear actuator. The actuator 19 is rigidly and fixedly connected relative to the guide block assembly 14 via threaded members or other connection means. The actuator 19 includes an external housing comprised of a longitudinally extending and extruded side wall 20, a rear end cap 21 and a front end cap 22. The side wall 20 is an extruded, hollow and longitudinally extending wall section having forward and rearward open ends to mate with the end caps 22 and 21, respectively. Although the preferred embodiment shows the side wall 20 as having a generally square cross-sectional configuration, it could be generally circular or any other configuration. The rearward end of the side wall 20 is connected to the rear end cap 21 via the connection flange 24 and the forward end of the side wall 20 is connected to the front or forward end cap 22 via the connection flange 25. A plurality of threaded members 26 (FIGS. 1, 7 and 8) extend between the end caps 21 and 22 to maintain the housing sections in their assembled form. If desired, O-rings or other seal members 28 and 29 may be provided between end portions of the side wall 20 and the connecting flanges 24 and 25, respectively.

The actuator 19 further includes conventional linear actuator elements in the form of a rotatable, but axially fixed, lead screw 30, an axially moveable, but rotationally fixed, roller nut 31 and an axially movable, but rotationally fixed, elongated thrust tube or thrust member 32. The thrust member 32 is connected with the nut 31 at its inner or rearward end 34. In the preferred embodiment, the nut 31 and tube 32 are retained in a rotationally fixed position relative to the actuator housing by their connection to one another and by the connection of the tube 32 to a rotationally fixed portion of the FSW spindle module 56 as described below. In accordance with conventional linear actuator operation, the lead screw 30 is provided with external threads such as ball or roller screw threads and the nut 31 is provided with complementary internal ball or roller screw threads for engagement with the lead screw threads. With this arrangement, rotation of the lead screw 30, with the nut 31 and thrust tube 32 remaining rotationally fixed, will result in axial movement of the nut 31, and thus the thrust tube 32, along the screw 30.

As shown in FIGS. 2 and 3, the thrust tube 32 of the preferred embodiment is an elongated, hollow member connected with the nut 31 at its rearward end 34. The forward end 35 includes a closed end defined by the connection member 36 for connection to a portion of the rear end cap of the FSW module as will be described in greater detail below. As shown, the thrust member 32 is a substantially cylindrical member extending from the nut 31 to its closed end and has a maximum diameter no greater than the internal diameter of the end cap portion 52 through which the member 32 extends.

A rearward, narrowed down end portion 38 of the lead screw 30 is connected for rotation with an actuator rotor 39. This portion 38 is preferably untapered. A shoulder is provided between the portion 38 and the threaded portion of the screw 30 to seat the rotor 39. The rotor 39 is mounted for rotation relative to the rear end cap 21 via a thrust bearing 40. As shown, the thrust bearing 40 is radially positioned between an outer longitudinal surface of the rotor 39 and an inner longitudinal surface portion of the end cap 21. The thrust bearing 40 is longitudinally retained relative to the end cap 21 via the shoulder 41 and the snap ring 42. The forward end portion 37 of the lead screw 30 is provided with an extend bumper 43 and is housed within the hollow thrust member 32. Thus, in the preferred embodiment, the forwardmost end of the screw 30 is housed entirely within the thrust tube 32 during movement of the tube 32 between its extended and retracted positions. Thus, the forward end of the screw 30 is also rearward of the connection end 36 during such movement. This facilitates more space efficient connection of the thrust member 32 with the FSW module. A plurality of retract bumpers 47 in the form of a plurality of circumferentially spaced rubber pads are provided on the rearward end of the end cap portion 57.

The rotor 39 includes a forwardly extending rotor portion 44 connected with and rotated by an actuator motor comprising the motor housing 45, the motor windings 46 and the motor magnets 48. The actuator motor is mounted within the actuator housing relative to the side wall 20. Accordingly, rotation of the motor causes rotation of the rotor 39 and thus the lead screw 30. In the preferred embodiment, the motor is what is commonly referred to as a hollow core motor having a hollow interior through which the lead screw 30 extends. The motor is servo driven and is controlled via conventional control means through an encoder 49 connected with a rearward end of the lead screw 30 and an encoder reader 50. A cover plate 33 is connected with the rear end cap 21 via a plurality of threaded members. The control or motion control means of the actuator motor controls the rotation of the motor, and thus rotation of the lead screw 30, both in a forward and rearward direction. This correspondingly controls axial, linear movement of the nut 31 and the thrust tube 32 in forward and rearward directions. A pair of ports or connectors 51 are positioned near the rearward end of the actuator and extend from the rear end cap 21 for providing power and control signals to the actuator motor.

The front end cap 22 includes a rearward portion connected with the side wall 20 via the connection flange 25 and a forwardly extending, necked down or reduced diameter portion 52. As shown, bearing or bushing means 54 are provided on an inwardly facing portion of the section 52 near its forwardmost end to guide axial or linear movement of the thrust tube 32. As best shown in FIG. 3, this forwardly extending portion 52 of the front cap 22 is generally hollow to define a roller nut receiving cavity 53. This cavity 53 is sized to accommodate and receive a portion of the roller nut 31 when the actuator 19 is in its extended position as shown in FIG. 3. Accordingly, when the actuator 19 is in an extended position as shown in FIG. 3, a portion of the nut 31 is positioned within the cavity 53. Wiper and/or scraper means 55 are also provided near the forward end of the section 52 for engagement with the outer surface of the thrust tube 32.

With continuing reference to FIGS. 2 and 3 as well as FIGS. 4-9, the FSW spindle or device module 12 (FIG. 1) includes a FSW spindle or device 56 (FIGS. 2 and 3) which is in line or substantially in line with the actuator 19. The FSW device 56 includes a housing comprised of the side wall 58, the rear end cap 59 and the front end cap 60. Similar to the linear actuator 19, the side wall 58 is a longitudinally extending, hollow extruded structure with open ends for connection to the caps 59 and 60. Specifically, the side wall 58 is connected at its rear end to the rear end cap 59 via the connection flange 61 and is connected at its forward end to the front end cap 60 via the connection flange 62. If desired, an O-ring or other seal member 64 and 65 may be provided between the ends of the side wall 58 and the connection flanges 61 and 62, respectively. The side wall 58 may be generally cylindrical or may have a generally square cross sectional configuration as shown.

The rear end cap 59 of the FSW device 56 includes a rearward end section 57, a first forwardly extending reduced diameter section 71 and a second forwardly extending reduced diameter section 70. As shown, the end 57 is connected with the side wall 58 via the connection flange 61 and includes a plurality of peripherally arranged intake breather recesses 63. As shown best in FIG. 1, the outer peripheral corners of the cap 59 are provided with openings to receive a plurality of threaded members 77. These members 77 extend from the end cap 59 to the end cap 60 to maintain the housing in an assembled form. Two corners 83 (FIGS. 1 and 9) of the cap 59 are connected with the lower ends of the guide rods 23 via threaded members or other connecting means 87 (FIG. 9). With this structure, sliding movement of the rods 23 within the guide block housing 17 guides movement of the FSW spindle or device 12 linearly relative to the actuator 11, the guide assembly 14 and the "C" gun assembly 15 (FIG. 1).

The first forwardly extending section 71 of the rear end cap extends radially inwardly from the rearward end section 57 and has an inner longitudinally extending surface 72 defining a nesting cavity 74 to receive and accommodate the forward reduced diameter section 52 of the actuator front end cap 22. This nesting cavity 74 is generally cylindrical and includes an inner radial dimension slightly greater than the outer radial dimension of the reduced diameter section 52. This permits the actuator section 52 to nest within the cavity 74 when the FSW device is retracted as shown in FIG. 2, thereby resulting in an overall decrease in the length dimension of the FSW apparatus (the actuator and FSW modules) without sacrificing the distance which the FSW module can be extended.

The second forwardly extending section 70 of the FSW device rear end cap 59 extends forwardly of the section 71 and is integrally joined with the section 71 via the central section 73. As described below, the section 70, or at least a portion thereof, is positioned longitudinally between the ends of the FSW motor, with its outer longitudinal surface supporting the FSW rotor via the thrust bearing 68. The central section 73 includes an opening to facilitate connection to a forward connection member 36 of the thrust tube 32 along the axial center of the apparatus. As shown, a screw or threaded member 79 extends through the opening in the end cap central section 73 and is threadedly received by the connection member 36. Access to the screw 79 is provided along the axial center of the FSW device by removing the tool 84 and inserting an appropriate connection tool such as a screwdriver or allen wrench or the like.

As shown best in FIGS. 2 and 3, the FSW module 56 includes a motor, specifically a brushless servo motor comprised of the motor housing 75, the motor windings 76, the motor magnets 78 and a rotor 66. The motor is mounted within the FSW device housing and fixed relative to the side wall 58. The rotor 66, which includes a rearwardly extending, increased diameter rotor section 69, is mounted for rotation by the motor within and relative to the housing via the thrust bearing 68. More specifically, as shown, the thrust bearing 68 is mounted between a radially outer, longitudinally extending surface portion of the end cap section 70 and a radially inner, longitudinally extending surface portion of the rotor section 69. Thus, the bearing 68 is mounted radially between the stationary end cap or housing section 70 and the rotating rotor section 69 and longitudinally between, or at least partially between, the forward and rearward ends of the FSW device motor or motor windings 76. Preferably, the FSW motor is a high pole (at least 12-16) motor to keep the rotor body and magnets as thin as possible.

While the rotor 66 is supported for rotation relative to the section 70 of the end cap 59 near its rearward end by the thrust bearing 68, it is supported for rotation relative to a portion of the front end cap 60 near its forward end by the thrust bearing 80. Specifically, the thrust bearing 80 is supported by a rearwardly extending section 81 of the end cap 60 and is retained longitudinally relative to the rotor 66 by the snap ring 92 and is retained relative to the front end cap 60 via the shoulder 94. The forward end of the rotor 66 is provided with means in the form of a set screw 82 for holding the FSW tooling or tool head 84. The tooling 84 can comprise any conventional FSW tooling or tool head usable in connection with friction stir welding and more specifically, friction stir spot and/or stitch welding. In the preferred embodiment, the tool 84 bottoms out against, and its rearward axial position is defined, by the shoulder 87.

A cooling fan 85 is positioned within a fan cavity 86 formed by portions of the front end cap 60. The fan 85 includes a base 88 connected with the rotor 66 via a plurality of threaded members or the like 89. The FSW module 56 also includes a plurality of air intake breathers 90 in the rear end cap 59 and a plurality of exhaust breathers 91 in the front end cap 60. The breathers 90 and 91 provide a means for cooling or ambient air to flow from the rearward end of the FSW module, between the windings and magnets of the motor and then out through the exhaust breathers 91 at the forward end of the module, thereby cooling the motor. If desired, this exhaust air can be funneled or directed down over the FSW tool end for internally generated cooling of the tool end or head. This eliminates the need to plumb compressed air to the tip. Accordingly, the fan 85 rotates with the rotor 66 and provides a means to cool both the motor and the FSW tool head without external plumbing. Also, if desired, a second fan (not shown) at the rearward end of the FSW motor may be provided if further air flow is needed. This second fan would be located rearwardly of the motor windings 76 and radially outwardly of the rearward end of the rotor section 69.

The control and control feedback for the FSW device servo motor is provided by the encoder 95 connected with a portion of the rotor 66 and the encoder reader 96. In the preferred embodiment, this encoder is a relatively large diameter plastic magnetic ring encoder. Such an encoder has an open center section to accommodate connection of the tool 84, while providing the needed feedback of the FSW motor to the FSW controller. This allows the FSW device and rotor to connect at one end along the rotational axis to the thrust member 32 and to connect at the other, forward end to a tool head and tool insert without requiring installation of an inline feedback encoder or device. A cover 93 is connected to the forward end cap 60 by threaded members or the like. A pair of access ports or connectors 98 extend from the end cap 60 to provide power, signaling and control access to the FSW motor.

The FSW device also preferably includes means for sensing and monitoring the temperature of FSW components during operation so that the linear motion controller can compensate for thermal expansion or other change. In friction stir welding, precision depth control is important, particularly with respect to spot and/or stitch welding. Both FSW component deflection resulting from applied forces and FSW component change resulting from thermal expansion negatively influence how accurately such component can be controlled. Deflection can be characterized and compensated for in the linear motion controller of the actuator 11 by knowing the applied force and compensating for it. In accordance with the preferred embodiment of the present invention, the applied force is calculated through the applied current in the servo controlled linear actuator 19.

During operation of the FSW device of the present invention, thermal expansion or other change of FSW components can occur as a result of heat losses from the motor which are conducted through the bearing 68 and heat conducted up the tool 84 through the rotor 66. To sense and monitor this heat generation and transfer to FSW components, thermal sensors 99 and 100 have been added to non-rotating portions of the device housing closest to the sources of heat generation.

Specifically, in the preferred embodiment, a thermal sensor 99 is mounted to a portion of the end cap section 70 adjacent to the primary thrust bearing 68. This location represents the closest non-rotating point to the hottest location of the motor. During operation, losses from the motor conduct through the bearing 68 to the inner bearing journal generally comprised of the section 70. A temperature sensor 100 is also embedded within the rearwardly extending section 81 of the end cap and closely adjacent to the thrust bearing 80. This sensor 100 functions to sense the heat generated by rotation of the tool itself. Preferably, thermo sensors are located in one or both of these "hot spot" areas identified by reference characters 99 and 100 in FIGS. 2 and 3.

The thermal sensors of the preferred embodiment are KTY84-130 positive temperature coefficient thermistors manufactured by Phillips. However, such sensors 99 and 100 could be any of a variety of miniature temperature sensing devices embedded in the bearing support portions of the sections 70 and 81. Leads from the sensors 99 and 100 are provided to the linear motion controller of the actuator 11 through one of the ports 98 so that the temperature expansion due to such temperatures can be compensated for.

Accordingly, the friction stir weld apparatus of the preferred embodiment of the present invention includes a separate, self-contained linear actuator or actuator module having a thrust member movable linearally along a longitudinal axis and separate, self-contained fiction stir weld spindle or device module operably connected to the thrust member and movable linearally relative to the actuator along the longitudinal axis. In the preferred embodiment, this linear movement of the friction stir weld device is guided by a guide mechanism comprising a pair of guide rods connected with the friction stir weld device. Preferably, the actuator motor and the friction stir weld device motor are hollow core motors in which axial components of the actuator and the FSW device extend through the motors and in which the axial centers of rotation as well as the center of rotation of the tool 84, are concentric. Further, the FSW device in accordance with the preferred embodiment is provided with a nesting cavity at its rearward end which extends inwardly of the rearward end of the FSW device and forwardly of the rearward end of the FSW motor. This nesting cavity permits a forward portion of the actuator housing to actually nest or be positioned within a portion of the FSW device housing when the FSW module is in its retracted position, thereby reducing the overall required length of the FSW apparatus. To accommodate this nesting cavity, the thrust bearing 68 between the rear end cap housing section 70 and the rotor section 69 is positioned longitudinally between the ends of the FSW motor, and more specifically, near the forward end of the FSW motor.

Although the preferred embodiment of the present invention has been described with respect to a friction stir weld device and more specifically, to a friction stir weld device usable for spot and/or stitch welding, the present invention is useful for any tool or device which includes a rotating or rotatable tool head or member and which is linearly moveable. Such other tools may include, among others, various machining/milling tools which are moveable linearly toward and away from the surface to be machined or milled and with the rotating tool comprised of a machining or milling tool head. Such other tool may also be a router or a drill with the rotating member comprised of a router or drill bit. Still further, the tool could be a screw or fastener driver device in which the screw or fastener is rotated and the tool is linearly advanced as the screw or other fastener advances into the parts to be connected. Still further, it is contemplated that the present invention is usable in any application in which the tool or device requires a combination of linear and rotational movement. One example is in the process of palletizing where cartons, containers or other objects are gripped by a tool end, lifted and then rotated for positioning onto a pallet. Many of the above applications also require lateral movement of the tool in a direction generally perpendicular to the above-mentioned linear movement. Such lateral movement may be provided by means known in the art such as robots or other actuators.

Accordingly, the present invention includes an actuator module comprising a linear actuator, a tool or other device having a rotatable tool head or member and operatively connected to a linearly moveable portion of the actuator for linear movement along a longitudinal axis and a guide assembly for guiding linear movement of the tool or device. The actuator and the tool each include separately controllable motors, preferably servo motors, for controlling linear movement of the tool and rotational movement of the tool head, respectively. Preferably, these motors are hollow core motors to facilitate a move compact apparatus.

In the preferred embodiment of the present invention, rotational motion of the actuator motor is converted to linear motion of the thrust member 32 as a result of rotation of the lead screw 30 and axial movement of the non-rotatable nut along the screw 30 in a linear direction. It is contemplated, however, similar to other existing linear actuators, that the nut 31 could be rotated with the actuator motor, but be axially fixed, and for the screw 30 to be rotationally fixed, but axially and linearly moveable relative to the rotating nut. In such an embodiment, the screw 30 would be connected to a thrust tube or member or the screw 30 would itself be the thrust member and be connected directly to the FSW module.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

The invention claimed is:

1. A friction stir weld apparatus comprising:
 a linear guide mechanism;
 a linear drive actuator having a housing fixed relative to said guide mechanism and comprising:
  a hollow core motor mounted within the housing and having a rearward end, a forward end, and an axis of rotation;
  a lead screw extending through the motor and which is rotatable, but axially fixed relative the housing, wherein the lead screw is directly connected to the hollow core motor;
  a nut operably connected to the lead screw and which is rotationally fixed, but axially moveable relative the lead screw; and
  an elongated, hollow thrust member, operably connected to the nut, and extending through the motor, the thrust member being moveable linearly along the axis of rotation from a rearward position substantially within the housing to a forward position substantially outside of the housing; and
 a friction stir weld device operatively connected to said guide mechanism and directly connected to said thrust member for linear movement relative to said actuator along said axis of rotation, wherein the hollow core motor alone:
  axially positions the friction stir weld device relative to a work surface; and
  supplies axial forging force to the friction stir weld device.

2. The apparatus of claim 1 wherein said guide mechanism includes at least one guide rod and wherein said friction stir weld device is operatively connected to said at least one guide rod.

3. The apparatus of claim 1 including a "C" gun assembly wherein said guide block assembly is connected with said "C" gun assembly.

4. The apparatus of claim 3 including a welding robot operatively connected with said "C" gun assembly.

5. The actuator of claim 1 wherein the hollow core motor includes an actuator end closest to said actuator and a tool end furthest from said actuator end, said friction stir weld device further including a rotor spaced radially inwardly from said motor and a bearing member positioned radially inwardly from said rotor and longitudinally between said actuator end and said tool end of said motor.

6. The apparatus of claim 5 wherein said thrust member includes a distal end and wherein said distal end is operatively connected to said friction stir weld device at a point longitudinally between said actuator end and said tool end of said motor.

7. A friction stir weld apparatus comprising:
a linear drive actuator comprising an actuator housing, an actuator motor, a rotatable lead screw extending through the motor with an axis of rotation, wherein the lead screw is directly connected to the actuator motor, and a thrust member movable linearly along a longitudinal axis substantially concentric with said axis of rotation; and
a friction stir weld device operatively connected to said thrust member and movable linearly relative to said actuator;
wherein said actuator housing includes a forward end and said friction stir weld device includes a rearward end with a nesting cavity, wherein a portion of the forward end of said actuator housing is positioned within said nesting cavity when said friction stir weld device is in a retracted position relative to the actuator, and wherein actuator motor alone:
rotates the lead screw to axially position the friction stir weld device relative to a work surface; and
supplies the sole axial forging force to the friction stir weld device.

8. The apparatus of claim 7 wherein said friction stir weld device is movable linearly along said longitudinal axis between a rearward, retracted position relative to said actuator and at least one forward, extended position relative to said actuator.

9. A friction stir weld apparatus comprising:
a linear drive actuator having a housing and comprising a first hollow core motor having a longitudinal axis and a thrust member movable linearly along the longitudinal axis between forward and rearward positions, said thrust member being positioned at least partially within said housing; and
a separate friction stir weld device comprising a second hollow core motor and having a rearward end, wherein the first hollow core motor provides the only motorized axial positioning of the friction stir weld device relative to a work surface and further supplies the sole axial forging force to the friction stir weld device;
further wherein a distal end of the rearward end includes a nesting cavity and the friction stir weld device is operatively connected to said thrust member at a point on said friction stir weld device forward of a proximal end of said rearward end and within said nesting cavity for linear movement along said longitudinal axis; and
further wherein said actuator includes a forward end, wherein said friction stir weld device is movable between retracted and extended positions relative to said actuator and wherein said forward end is positionable within said nesting cavity when said friction stir weld device is in its retracted position.

10. An apparatus comprising:
a linear guide mechanism;
a linear drive actuator including no more than two motors and having a housing fixed relative to said guide mechanism and comprising:
  a hollow core motor mounted within the housing and having a rearward end, a forward end, and an axis of rotation;
  a lead screw extending through the motor and which is rotatable, but axially fixed relative the housing, wherein the lead screw is directly connected to the hollow core motor;
  a nut operably connected to the lead screw and which is rotationally fixed, but axially moveable relative the lead screw; and
  an elongated, hollow thrust member, operably connected to the nut, and extending through the motor, the thrust member being moveable linearly along the axis of rotation from a rearward position substantially within the housing to a forward position substantially outside of the housing; and
a tool device operatively connected to said guide mechanism and to said thrust member for linear movement relative to said actuator along said longitudinal axis, said tool device including a tool head rotatable about said axis of rotation, wherein the hollow core motor alone:
rotates the lead screw to axially position the tool device relative to a work surface; and
supplies axial force to the tool device.

11. The apparatus of claim 10 wherein said tool device is moveable linearly along said longitudinal axis between a rearward, retracted position and at least one forward, extended position relative to said actuator.

12. The apparatus of claim 10 wherein said actuator includes a forward end and said tool device includes a rearward end with a nesting cavity and wherein a portion of the forward end of said actuator is positioned within said nesting cavity when said tool device is in its retracted position.

13. The apparatus of claim 12 wherein said tool device is a friction stir weld device.

14. The apparatus of claim 10 wherein said guide mechanism includes at least one guide rod and wherein said tool device is operatively connected to said at least one guide rod.

15. The apparatus of claim 10 wherein said tool device includes a hollow core motor, said motor having an actuator end closest to said actuator and an opposite tool end, said tool device further including a rotor spaced radially inwardly from said motor and a bearing member positioned radially inwardly from said rotor and longitudinally between said actuator end and said tool end of said motor.

16. The apparatus of claim 10 wherein said thrust member includes a distal end and wherein said distal end is operatively connected to said tool device at a point longitudinally between said actuator end and said tool end of said motor.

17. A friction stir weld apparatus comprising:
a support member;
a linear drive actuator fixed relative to said support and having a housing, a first motor with an axis of rotation, a lead screw directly connected to the first motor, a nut having threads compatible with said lead screw and a thrust member having a connection end, one of said nut and said screw being rotatable with said first motor and axially fixed relative to said housing and the other of said nut and said screw being rotatably fixed relative to said housing and axially moveable along said axis of rotation, said screw having a free end terminating within the actuator housing and rearwardly of said connection end, wherein there is no more than one lead screw in the apparatus; and
a friction stir weld device comprising a second hollow core motor positioned external to the linear drive actuator housing and connected with said connection end, wherein said first motor rotates the lead screw to axially position the friction stir weld device relative to a work surface, and wherein said first motor further supplies axial forging force to the friction stir weld device.

* * * * *